United States Patent
Peng et al.

(10) Patent No.: US 11,606,255 B2
(45) Date of Patent: Mar. 14, 2023

(54) METHOD AND APPARATUS FOR CREATING NETWORK SLICES

(71) Applicant: ZTE CORPORATION, Shenzhen (CN)

(72) Inventors: Shaofu Peng, Shenzhen (CN); Baoya Zhang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 17/103,924

(22) Filed: Nov. 24, 2020

(65) Prior Publication Data

US 2021/0083940 A1  Mar. 18, 2021

Related U.S. Application Data

(63) Continuation of application No. PCT/CN2019/101700, filed on Aug. 21, 2019.

(30) Foreign Application Priority Data

Sep. 25, 2018 (CN) .......................... 201811116143.3

(51) Int. Cl.
*G06F 15/16* (2006.01)
*H04L 41/0893* (2022.01)
(Continued)

(52) U.S. Cl.
CPC ...... *H04L 41/0893* (2013.01); *H04L 41/0806* (2013.01); *H04L 45/123* (2013.01); *H04L 45/507* (2013.01)

(58) Field of Classification Search
CPC . H04L 45/507; H04L 45/123; H04L 41/0806; H04L 41/0893
(Continued)

(56) References Cited

U.S. PATENT DOCUMENTS 8,942,256 B1 * 1/2015 Barth .................. H04L 43/0847
370/255
2012/0307644 A1 * 12/2012 Gandhi ............... H04L 41/0893
370/241
(Continued)

FOREIGN PATENT DOCUMENTS

CN  100466597 C  3/2009
CN  105516312 A  4/2016
(Continued)

OTHER PUBLICATIONS

Analog Radio Over Fiber Fronthaul for High Bandwidth 5G Millimeter-Wave Carrier Aggregated OFDM Dimitrios Konstantinou; 2019 21st International Conference on Transparent Optical Networks (ICTON) (Year: 2019).*
(Continued)

*Primary Examiner* — Oscar A Louie
*Assistant Examiner* — Oluwatosin M Gidado
(74) *Attorney, Agent, or Firm* — MH2 Technology Law Group LLP (57) ABSTRACT

Disclosed are a method and an apparatus for creating network slices. The method for creating network slices comprises: creating a slice-bundles link between a first node and a second node, wherein the slice-bundles link comprises at least one member link created between the first node and the second node; and configuring a packet service for the slice-bundles link.

14 Claims, 5 Drawing Sheets

(51) Int. Cl.
*H04L 41/0806* (2022.01)
*H04L 45/12* (2022.01)
*H04L 45/50* (2022.01)

(58) Field of Classification Search
USPC .......................................................... 709/223
See application file for complete search history.

(56) References Cited

U.S. PATENT DOCUMENTS

| | | | |
|---|---|---|---|
| 2013/0308945 A1* | 11/2013 | Dhillon | H04Q 11/0003 398/48 |
| 2014/0016470 A1* | 1/2014 | Li | H04L 47/125 370/235 |
| 2014/0301404 A1* | 10/2014 | Zheng | H04L 45/02 370/419 |
| 2015/0124837 A1* | 5/2015 | Saltsidis | H04L 45/245 370/419 |
| 2015/0288384 A1 | 10/2015 | Gladwin et al. | |
| 2016/0234105 A1 | 8/2016 | Li et al. | |
| 2016/0277959 A1* | 9/2016 | Venkataraman | H04L 45/125 |
| 2016/0294632 A1* | 10/2016 | Bhatia | H04L 41/12 |
| 2017/0245140 A1 | 8/2017 | Au et al. | |
| 2017/0257309 A1* | 9/2017 | Appanna | H04L 12/4641 |
| 2018/0013653 A1 | 1/2018 | Pai et al. | |
| 2019/0097949 A1* | 3/2019 | Viradiya | H04L 49/70 |
| 2019/0289647 A1 | 9/2019 | Li | |
| 2021/0021647 A1* | 1/2021 | Cai | H04L 65/1026 |

FOREIGN PATENT DOCUMENTS

| | | | | |
|---|---|---|---|---|
| CN | 105594167 A | 5/2016 | | |
| CN | 105791108 A | 7/2016 | | |
| CN | 105812256 A | 7/2016 | | |
| CN | 107426776 A | 12/2017 | | |
| CN | 107734482 A | 2/2018 | | |
| CN | 108206790 A | 6/2018 | | |
| CN | 108243106 A | 7/2018 | | |
| EP | 1921808 A1 * | 5/2008 | ............ | H04L 45/00 |
| EP | 2424146 A1 | 2/2012 | | |
| WO | 02062012 A2 | 8/2002 | | |
| WO | WO-2015069168 A1 * | 5/2015 | ......... | H04L 41/0879 |
| WO | WO-2016026452 A1 * | 2/2016 | ......... | H04L 12/4637 |
| WO | 2017150826 A1 | 9/2017 | | |
| WO | 2018/113692 A1 | 6/2018 | | |

OTHER PUBLICATIONS

Leveraging Multiplexing Gain in Network Slice Bundles Qian Xu;Xiang Yan;Kui Wu;Jianping Wang;Kejie Lu;Weiwei Wu IEEE Transactions on Network Science and Engineering Year: 2021 | vol. 8, Issue: 1 | Journal Article | Publisher: IEEE (Year: 2021).*
How to Create a Network Slice?—A 5G Core Network Perspective Wangbong Lee;Taeheum Na;Jeongyun Kim 2019 21st International Conference on Advanced Communication Technology (ICACT) Year: 2019 | Conference Paper | Publisher: IEEE (Year: 2019).*
Aggregate RSVP implementation experience and performance analysis for applicability in tactical IP networks Isil Sebuktekin;John Haluska;Dana Chee;Jim Giacopelli;Yeng-Zhong Lee;Kevin Adams;Jeffrey Pulliam MILCOM 2008—2008 IEEE Military Communications Conference Year: 2008 (Year: 2008).*
Network slice access selection scheme in 5G Huan Wei; Zhenfeng Zhang; Bin Fan 2017 IEEE 2nd Information Technology, Networking, Electronic and Automation Control Conference (ITNEC) Year: 2017 | Conference Paper | Publisher: IEEE (Year: 2017).*
ZTE Corporation, International Search Report, PCT/CN2019/101700, Oct. 28, 2019, 5 pgs.
$3^{rd}$ Generation Partnership Project, "Technical Specification Group Radio Access Network; Study on New Radio Access Technology; Radio Access Architecture and Interfaces (Release 14)," Technical Report, *3GPP*, TR 38.801, V1.1.0, Jan. 31, 2017, 83 pgs.
$3^{rd}$ Generation Partnership Project, "Technical Specification Group Radio Access Network; Study on New Radio Access Technology; Radio Access Architecture and Interfaces (Release 14)," Technical Report, *3GPP*, TR 38.801, V2.0.0, Mar. 31, 2017, 90 pgs.
ZTE Corporation, International Search Report, PCT/CN2019/101700, dated Oct. 28, 2019, 5 pgs.
ZTE Corporation, Extended European Search Report, EP 19865125.9, dated Jun. 25, 2021, 11 pgs.
Akihiko Nakao, "Baseline Document: Application of network softwarization to IMT-2020; IMT-O-028," ITU-T Draft, Study Period 2013-2016, Focus Group IMT-2020, Series IMT-O-028, International Telecommunication Union, Geneva, CH, vol. imt-2020, May 25, 2016, 57 pgs.
Chinese First Office Action dated Jul. 26, 2022 in corresponding Chinese Application No. 201811116143.3, translated, 22 pages.
European Third Office Action dated Aug. 24, 2022 in corresponding European Application No. 19865125.9, 9 pages.

* cited by examiner

METHOD AND APPARATUS FOR CREATING NETWORK SLICES

CROSS-REFERENCES TO RELATED APPLICATIONS

The present application is a continuation of PCT Patent Application No. PCT/CN2019/101700, filed Aug. 21, 2019, which claims the benefit of priority to Chinese Patent Application No. 201811116143.3, filed Sep. 25, 2018, each of which is hereby incorporated by reference in its entirety.

TECHNICAL FIELD

Embodiments of the present application relate to 5G (5Generation, the fifth generation mobile communication technology) slice technology, for example, to a method and apparatus for creating network slices.

BACKGROUND

There are some requirements for bearer networks when adopting the 5G slice technology, including that respective slices have to be provided with their own dedicated bearer sub-networks. Resources of respective dedicated bearer sub-networks may be hard isolated strictly, or soft isolation that achieves an approximate effect as the hard isolation may be adopted. A packet network does not support hard isolation, but support statistical multiplexing, which is more economical than private network or TDM (Time Division Multiplex) network. It can be seen that in order to meet the requirement of 5G slice technology, underlay network resources of the packet network need to be sliced to meet requirements of different overlay services, such as VPN (Virtual Private Network) services. Currently, the industry has proposed a variety of 5G bearer network slice technologies. For example, when using IGP (Interior Gateway Protocol) multi-topology technology, a physical network topology is divided into multiple logical sub-topologies, and different overlay services are assigned to different logical sub-topologies. Further, when using IGP flexible algorithm (Flex-algorithm) technology, multiple IGP algorithms are executed in the same topology to calculate multiple Flex-algorithm planes, and different overlay services are iterated to different Flex-algorithm planes. In the above 5G bearer network slice technologies, the IGP multi-topology technology needs to maintain multiple IGP routing tables in the packet network equipment, and thus the implementation overhead and cost are high, such that the IGP multi-topology technology is rarely used in actual network deployment. Besides, the IGP Flex-algorithm technology cannot effectively support TE (Traffic Engineering) bandwidth reservation requirements, which limits the application of the IGP Flex-algorithm technology. In fact, the original intention of the IGP Flex-algorithm technology is not to provide a network slice solution, but to compress a label stack of Segment Routing policy (SR policy, see draft-ietf-spring-segment-routing-policy-01).

In a 5G bearer network, one basic requirement is that the underlay network resources need to be sliced, that is, some underlay network resources need to be configured with dedicate slice-id; and another basic requirement is that the overlay services are businesses within dedicated slices and will also be configured with its dedicated slice-id.

In related art, it is impossible to map the overlay services belonging to one slice to the underlay network resources dedicated to the slice.

SUMMARY

Some embodiments of the present application provide a method for creating network slices, comprising:

creating a slice-bundles link between a first node and a second node, wherein, the slice-bundles link comprises at least one member link created between the first node and the second node; and configuring a packet service for the slice-bundles link.

Some embodiments of the present application also provide an apparatus for creating network slices, comprising:

a creation unit configured for creating a slice-bundles link between a first node and a second node, wherein, the slice-bundles link comprises at least one member link created between the first node and the second node; and a configuration unit configured for configuring a packet service for the slice-bundles link.

Some embodiments of the present application also provide an apparatus for creating network slices, comprising a memory, a processor, and a computer program stored on the memory and run on the processor, when executed by the processor, the computer program implements the method for creating network slices described above.

The embodiments of the present application also provide a computer-readable storage medium storing an information processing program that, when executed by a processor, implements the method for creating network slices described above.

DETAILED DESCRIPTION

Hereinafter, the embodiments of the present invention will be described in detail with reference to the accompanying drawings. Steps shown in the flowchart of the drawings, such as a set of computer-executable instructions, may be executed in a computer system. Although a logical sequence is shown in the flowchart, in some cases, the steps shown or described may be performed in a different order.

The present application provides a method for creating network slices, which is simple to implement and easy to deploy. The method can simply and effectively map overlay services belonging to a specific slice to underlay network resources dedicated to the specific slice.

Embodiment 1

Figure 1:
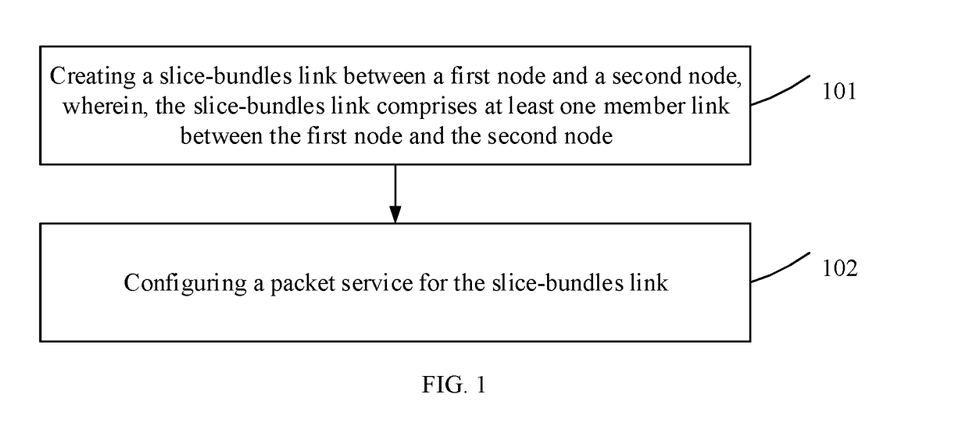
FIG. 1 is a flowchart diagram illustrating a method for creating network slices according to Embodiment 1 of the present application.

FIG. 1 is a flowchart diagram illustrating the method for creating network slices according to Embodiment 1 of the present application. As shown in FIG. 1, the method comprises the following steps.

At step 101, creating a slice-bundles link between a first node and a second node, where, the slice-bundles link comprises at least one member link created between the first node and the second node.

At step 102, configuring a packet service for the slice-bundles link.

In an embodiment, before creating the slice-bundles link between the first node and the second node, the method further comprises: creating the at least one member link between the first node and the second node; configuring, for each member link, a slice to which the member link belongs, and configuring, for each node, a slice to which the node belongs.

In an embodiment, the creating the slice-bundles link between the first node and the second node comprises: creating slice-bundles interfaces on the first node and the second node respectively, where the slice-bundles interfaces are connected to each other; and adding the at least one member link to the slice-bundles interface as a member interface.

In an embodiment, the configuring, for each member link, a slice to which the member link belongs, and configuring, for each node, a slice to which the node belongs: configuring, for each member link, at least one slice attribute of the member link; and configuring, for each node, at least one slice attribute of the node.

In an embodiment, the configuring the packet service for the slice-bundles link comprises configuring the packet service on the slice-bundles interface.

In an embodiment, the method further comprises: flooding link state information and maintaining a consistent link state database on each node. The link state database records the flooded link state information, the link state information carries the slice attribute of each node and carries the state information and slice attribute of each member link.

In an embodiment, the method further comprises: performing slice path calculation based on the link state database.

In an embodiment, performing slice path calculation may comprise any of the following:

performing a constrained shortest path first (CSPF) calculation to calculate a shortest path from the first node to all the other destination nodes in the first slice to which the first node belongs. The constraint conditions for performing the CSPF calculation are {the slice-id of the first slice, and igp-metric is the smallest}; the calculation comprises: matching a slice attribute of each member link contained in the slice-bundles link and a slice attribute of each node according to the constraint conditions to obtain the shortest path forwarding table entry of the first slice, that is, an optimal next hop forwarded by the shortest path of the first slice. Slice-id is the key information that associates the overlay services with the underlay network resources; or performing the CSPF calculation based on the link state database to calculate a TE path from the first node to a destination node in the first slice to which the first node belongs. The constraint conditions for performing the CSPF calculation are {the slice-id of the first slice, the constraint condition A}. The constraint condition A comprises at least one of bandwidth, delay, affinity, TE metric, and maximum number of hops. The calculation comprises: matching a slice attribute of each member link contained in the slice-bundles link and a slice attribute of each node according to the constraint conditions to obtain the TE path of the first slice; or requesting a controller to perform the CSPF calculation based on the link state database to calculate a TE path from the first node to a destination node in the first slice to which the first node belongs. The constraint conditions for performing the CSPF calculation are {the slice-id of the first slice, the constraint condition A}. The constraint condition A comprises at least one of bandwidth, delay, affinity, TE metric, and maximum number of hops. The calculation comprises: matching a slice attribute of each member link contained in the slice-bundles link and a slice attribute of each node according to the constraint conditions to obtain the TE path of the first slice.

In an embodiment, the method further comprises: forwarding messages along the slice-bundles link.

In an embodiment, the method further comprises: setting a priority for each member link in the slice-bundles link according to a local policy.

The forwarding messages along the slice-bundles link comprises: in a process of forwarding a protocol message in a control plane along the slice-bundles link, always selecting an effective member link with the highest priority from the slice-bundles link for forwarding.

In an embodiment, the forwarding messages along the slice-bundles link comprises: in a process of forwarding a data message in a data plane along the slice-bundles link, selecting, from the slice-bundles link, a dedicated member link for the slice to which the data message belongs for forwarding; and if the dedicated member link of the slice to which the data message belongs is invalid, discarding the data message.

In an embodiment, the method further comprises: creating a new member link when creating a new slice; configuring the new member link as belonging to the new slice; and adding the new member link to the slice-bundles link.

In an embodiment, the configuring the packet service comprises configuring at least one of the following: IP address, enabling intermediate system to intermediate system (ISIS), resource reservation protocol traffic engineering (RSVP-TE), open shortest path first (OSPF) and label distribution protocol (LDP).

In an embodiment, the type of a member link comprises one of the following: flexible Ethernet channel (FlexE channel), aggregated link, Ethernet link, Ethernet VLAN sub-interface and P2P link.

In an embodiment, the slices are homogeneous networks or heterogeneous networks.

In an embodiment, the first node and the second node belong to a same autonomous system AS domain, or the first node and the second node belong to different AS domains, respectively.

Embodiment 2

Figure 2:
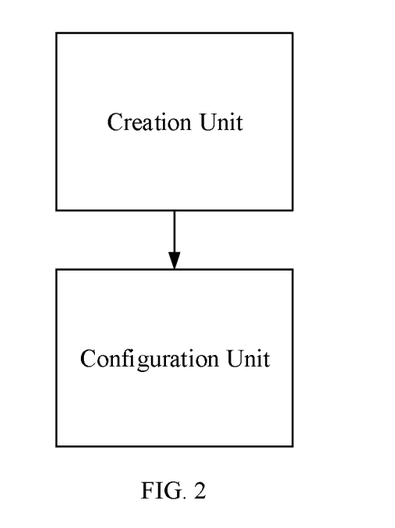
FIG. 2 is a structural diagram illustrating an apparatus for creating network slices according to Embodiment 2 of the present application.

FIG. 2 is a structural diagram of the apparatus for creating network slices according to Embodiment 2 of the present application. As shown in FIG. 2, the apparatus comprises a creation unit and a configuration unit.

The creation unit is configured to create a slice-bundles link between a first node and a second node, where, the slice-bundles link comprises at least one member link created between the first node and the second node. The configuration unit is configured to configure a packet service for the slice-bundles link.

In an embodiment, the creation unit is further configured to create at least one member link between the first node and the second node; and the configuration unit is further configured to configure, for each member link, a slice to which the member link belongs, and configure, for each node, a slice to which the node belongs.

In an embodiment, the creation unit is configured to create slice-bundles interfaces on the first node and the second node respectively, where the slice-bundles interfaces are connected to each other; and add the at least one member link to the slice-bundles interface as a member interface.

In an embodiment, the configuration unit is configured to configure, for each member link, at least one slice attribute of the member link; and configure, for each node, at least one slice attribute of the node.

In an embodiment, the configuration unit is configured to configure the packet service on the slice-bundles interface.

In an embodiment, the apparatus further comprises a flooding unit. The flooding unit is configured to flood link state information and maintain a consistent link state database on each node.

In an embodiment, the link state database records the flooded link state information, the link state information carries the slice attribute of each node and carries the state information and slice attribute of each member link.

In an embodiment, the apparatus further comprises a calculation unit. The calculation unit is configured to perform slice path calculation based on the link state database.

In an embodiment, the calculation unit is configured to perform any of the following slice path calculations:

performing a constrained shortest path first (CSPF) calculation to calculate a shortest path from the first node to all the other destination nodes in the first slice to which the first node belongs. The constraint conditions for performing the CSPF calculation are {the slice-id of the first slice, igp-metric is the smallest}; the calculation comprises: matching a slice attribute information of each member link contained in the slice-bundles link and the slice attribute information of each node according to the constraint conditions to obtain the shortest path forwarding table entry of the first slice; or performing the CSPF calculation based on the link state database to calculate a TE path from the first node to a destination node in the first slice to which the first node belongs, wherein, the constraint conditions for performing the CSPF calculation are {the slice-id of the first slice, a constraint condition A}. The constraint condition A comprises at least one of bandwidth, delay, affinity, TE metric, and maximum number of hops. The calculation comprises: matching slice attribute information of each member link contained in the slice-bundles link and the slice attribute information of each node according to the constraint conditions to obtain the TE path of the first slice; or requesting a controller to perform the CSPF calculation based on the link state database to calculate a TE path from the first node to a destination node in the first slice to which the first node belongs. The constraint conditions for performing the CSPF calculation are {the slice-id of the first slice, a constraint condition A}. The constraint condition A comprises at least one of bandwidth, delay, affinity, TE metric, and maximum number of hops. The calculation comprises: matching slice attribute information of each member link contained in the slice-bundles link and slice attribute information of each node according to the constraint conditions to obtain the TE path of the first slice.

In an embodiment, the apparatus further comprises a forwarding unit. The forwarding unit is configured to forward messages along the slice-bundles link.

In an embodiment, the apparatus further comprises a setting unit. The setting unit is configured to set a priority for each member link in the slice-bundles link according to a local policy.

In an embodiment, the forwarding unit is configured to always select an effective member link with the highest priority from the slice-bundles link for forwarding, in a process of forwarding a protocol message in a control plane along the slice-bundles link.

In an embodiment, the forwarding unit is configured to select, from the slice-bundles link, a dedicated member link for the slice to which the data message belongs for forwarding, in a process of forwarding a data message in a data plane along the slice-bundles link; and discard the data message, if the dedicated member link of the slice to which the data message belongs is invalid.

In an embodiment, the creation unit is further configured to create a new member link in when creating a new slice; and add the new member link to the slice-bundles link.

The configuration unit is further configured to configure the new member link as belonging to the new slice.

In an embodiment, the configuration unit is configured to configure at least one of the following: IP address, enabling intermediate system to intermediate system (ISIS), resource reservation protocol traffic engineering (RSVP-TE), open shortest path first (OSPF) and label distribution protocol (LDP).

In an embodiment, the type of a member link comprises one of the following: flexible Ethernet channel (FlexE channel), aggregated link, Ethernet link, Ethernet VLAN sub-interface and P2P link.

In an embodiment, the slices are homogeneous networks or heterogeneous networks.

In an embodiment, the first node and the second node belong to a same autonomous system AS domain, or the first node and the second node belong to different AS domains, respectively.

The technical solutions provided by the first and second embodiments of the present application do not need to run complex IGP multi-topology or flexible algorithms to provide slices, which are more concise to implement and easy to deploy, and can simply and effectively map the overlay services to their dedicated underlay internet resources.

The technical solutions provided in the first and second embodiments of the present application will be described in detail below through several simple examples.

Example 1

Figure 3:
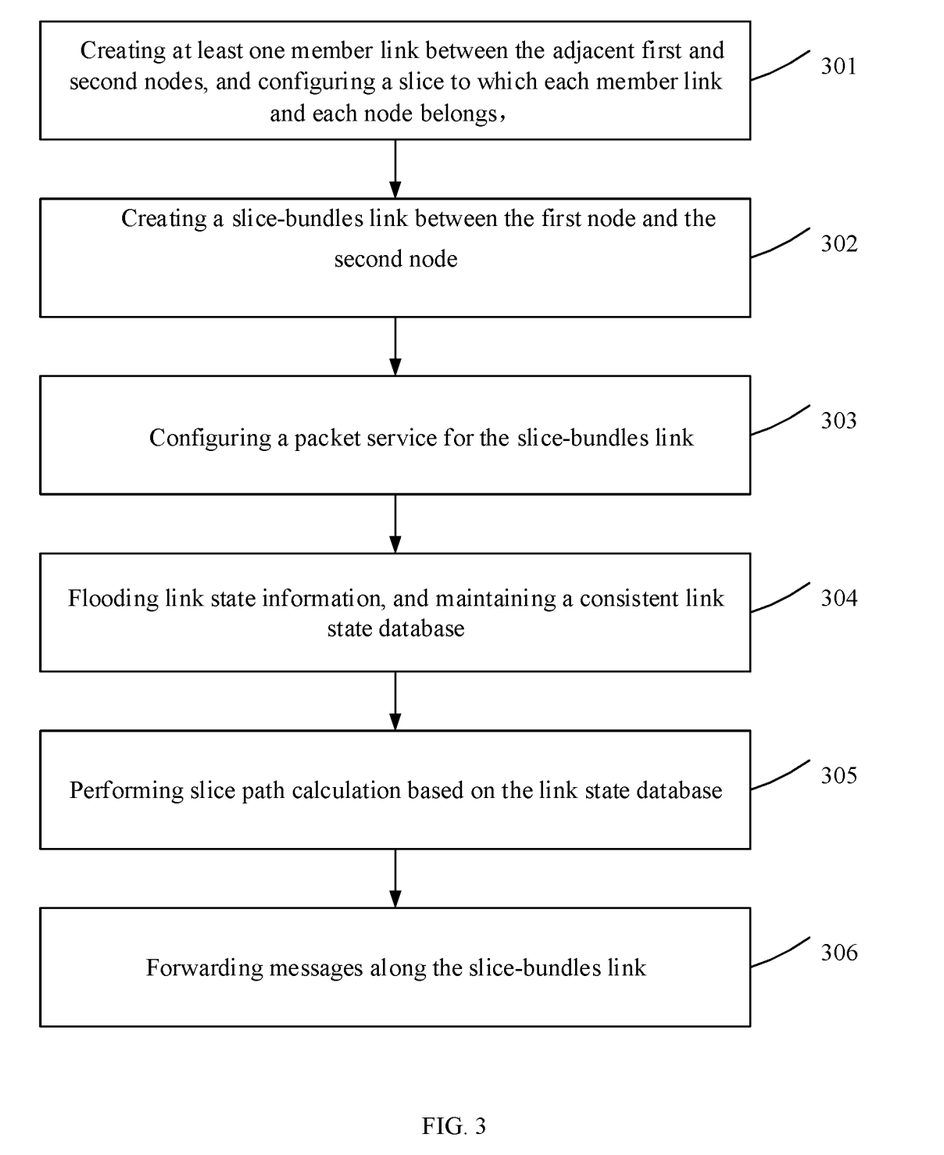
FIG. 3 is a flowchart diagram illustrating a method for creating network slices according to Example 1 of the present application.

FIG. 3 is a flowchart diagram illustrating the method for creating network slices according to Example 1 of the present application. As shown in FIG. 3, the method comprises the following steps.

At step 301, creating at least one member link between a first node and a second node adjacent to each other, and configuring a slice to which each member link and each node belongs.

The purpose of performing step 301 is to allocate network resources for a specific slice, that is, to configure topology-related resources (such as nodes and links) for a specific slice.

In this example, different slices may have different slice attributes. The slice attributes may be identified by slice-id, that is, different slices have different slice-ids. A slice-id of 0 indicates a default slice, that is, the entire network belongs to the default slice before any slice division of the bearer network. Non-zero slice-id means a valid slice identifier allocated to a corresponding overlay service.

In this example, a node may be configured as belonging to one slice or a plurality of slices, and a link may also be configured as belonging to one slice or a plurality of slices. Non-topology-related resources (such as CPU computing resources in a node, etc.) may also be configured as belonging to a specific slice.

In this example, step 301 may comprise: creating one or a plurality of member links between the first node and the second node adjacent to each other, configuring, for the member link, a slice to which each member link belongs, configuring, for the first node, a slice to which the first node belongs, and configuring, for the second node, the slice to which the second node belongs.

At step 302, creating a slice-bundles link between the first node and the second node.

In order to support the creation and deletion of slices more simply and flexibly, and minimize the impact of slice services on the bearer network (such as, changing the configuration as little as possible, and multiplexing Layer 3 (L3) configuration as much as possible), a slice-bundles link (which may be recorded as a slice-bundles link) may be established between two adjacent nodes in the IGP domain as needed, and the slice-bundles link comprises a plurality of member links belonging to a specific slice. The member links contained in the slice-bundles link may be traditional Ethernet links, Ethernet VLAN sub-interfaces, P2P links, or FlexE channels, or even aggregation links (for example, aggregation links created through LACP (Link Aggregation Control Protocol)).

At step 303, configuring a packet service for the slice-bundles link.

The packet service is only configured on the slice-bundles link, such as configuring IP (Internet Protocol) addresses, enabling IGP protocol (such as ISIS (Intermediate System to Intermediate System), OSPF (Open Shortest Path First)), and other protocols (such as LDP (Label Distribution Protocol), RSVP-TE (Resource Reservation Protocol Traffic Engineering)), etc. These configurations are not made on each member link contained in the slice-bundles link. Similarly, when crossing AS (Autonomous System) domains, a slice-bundles link may be established between two adjacent ASBR (Autonomous System Boundary Router) nodes and the packet services may only be configured on the slice-bundles link.

At step 304, flooding the link state information, and maintaining a consistent link state database. The consistent link state database described herein may be a consistent link state database maintained by each node in the IGP domain.

The purpose of performing step 304 is to notify network resources of a specific slice.

The consistent link state database is maintained by each node in the IGP domain. The link state database records flooded link state information, and the link state information carries the slice attribute of each node as well as the state information and slice attribute of each member link.

The link state information may be flooded in the IGP domain. The corresponding slice-id attribute is carried in the flooded link state information. The consistent link state database will be maintained by each node in the IGP domain. The link state database records specific slice-id attributes of each node and each link. For example, for the flooding of a slice-bundles link (which is a 3-layer link), information of member links in the slice-bundles link (as a 2-layer member link) may be included in the flooding process. Herein, it is not the IGP multi-topology technology, but the information notification within the topology (such as the default topology), and the link is not colored by using the TE affinity technology. The link is colored by using the TE affinity technology for the TE path calculation, and the slice-id is used to characterize the dedicated network resources of hard isolated slices, and they are in different layers. In fact, the TE affinity may be used to perform TE path calculation within a certain slice.

The controller may also collect link state data (including slice-id attribute) information on the network side by extending BGP-LS (North-Bound Distribution of Link-State and Traffic Engineering information using BGP, see RFC7752) of BGP (Border Gateway Protocol). On the network side, both the link state information in the IGP domain or and the link state information across AS domains may be reported to the controller. As to the report regarding the slice-bundles link (as a 3-layer link), specific member link (as a 2-layer member link) information may be contained in the reporting process.

Step 305: performing slice path calculation based on the link state database.

The performing slice path calculation comprises calculation of the shortest path, calculation of the TE path, and the like.

The calculation of the shortest path in a slice comprises: each node in the IGP domain may calculate, according to the slices it is added to, the shortest path to all other destination nodes in the first slice based on the above-mentioned consistent link state database by using CSPF (Constrained Shortest Path First) algorithm. The calculation constraints of the CSPF algorithm are {slice-id of the first slice, igp-metric is the smallest}, that is, the nodes and links contained in the shortest path calculated by the CSPF algorithm shall have a slice-id attribute corresponding to the first slice, and the IGP metric of the entire path is the smallest. The same calculation is performed on each node in the IGP domain, and an optimal next hop from each node to any other destination node in the IGP domain is obtained according to the calculation result, which may be used to generate a forwarding table entry of the shortest path within a specific slice (such as the first slice). The first slice may be any one of all the slices to which the first node belongs, and the "calculating the shortest path to all other destination nodes in the first slice" in the above calculation may be calculating the shortest path from the first node to any other destination node in the first slice to which it belongs.

The calculation of the TE path in the slice comprises: when triggered by a service or configuration, a certain node S in the IGP domain may need to calculate a TE path in the first slice from the node S to another node in the IGP domain and satisfying the constraint condition A. The calculation may still be performed based on the above-mentioned consistent link state database by using the CSPF algorithm. The calculation constraint condition of the CSPF algorithm is {slice-id of the first slice, constraint condition A}, that is, the nodes and links contained in the TE path calculated by the CSPF algorithm must have a slice-id attribute corresponding to the first slice, and they also satisfy constraint condition A. The constraint condition A may comprise at least one of bandwidth, delay, affinity, TE metric, maximum number of the hops, etc. In another example, the node S may also send the TE path calculation request to the PCE (Path Computation Element) through the PCEP (Path Computation Element Communication Protocol), and the calculation of the PCE are similar to those described above, but before that, the controller to which the PCE belongs needs to collect link state data (the link state data contains the slice-id attribute) information on the network side, for example, through BGP-LS. The first slice may be any one of all the slices to which the node S belongs.

The calculation of the shortest path described above requires each node to run the CSPF algorithm to calculate the shortest path from each node to any other destination node in the slice to which the node belongs. While, the calculation of the TE path described above only requires the head node of the TE path to perform calculation (or the head node requests the controller to perform calculation).

At step 306, forwarding messages along the slice-bundles link.

In the process of forwarding a protocol message in a control plane (such as ISIS, OSPF, BGP, LDP, RSVP-TE, etc.) along the slice-bundles link, the member link with the highest priority in the slice-bundles link is always selected for forwarding, and loads are not shared on a plurality of member links. The priority of each member link in the slice-bundles link may be set or determined according to a local policy. If a member link with the highest priority currently is invalid, a member link with the highest priority among the remaining member links will be selected.

In the process of forwarding a data message in a forwarding plane along the slice-bundles link, it is required to forward along the member link corresponding to a slice to which the message belongs. If the member link dedicated to the slice is invalid, the forwarded message of the corresponding slice will be discarded.

Compared with the related art, the technical solution provided in Example 1 of the present application does not need to run complex IGP multi-topology or flexible algorithms to provide slices, which are more concise to implement and easy to deploy, and can simply and effectively map the overlay services to their exclusive underlay internet resources.

Example 2

In Example 2, all slices are homogeneous networks. A homogeneous network refers to that virtual network topology maps corresponding to respective slices are the same, which means that all slices synchronously partition the resources of each node and each link in the underlying physical network, just with different shares. The method for creating network slices provided in the embodiments of the present application is applicable to the homogeneous network.

Figure 4:
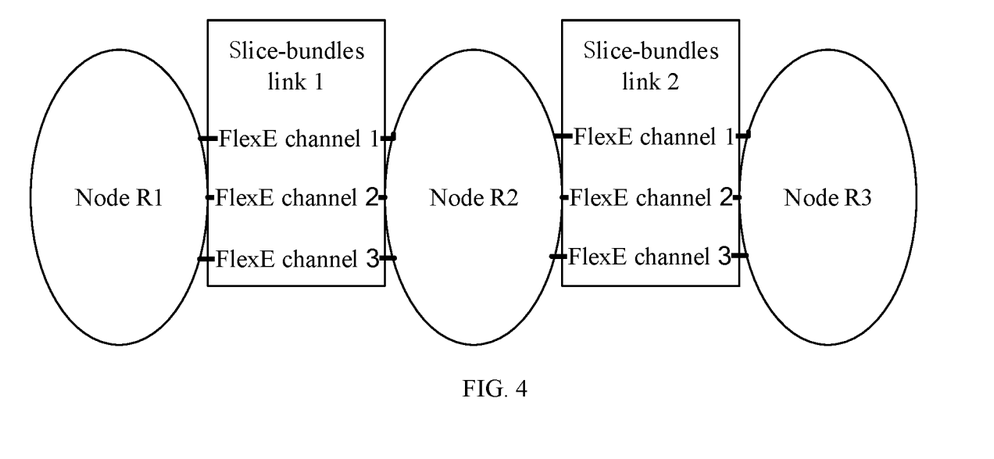
FIG. 4 is a network topology diagram of the network slice according to Example 2 of the present application.

FIG. 4 is a network topology diagram illustrating the network slice according to Example 2 of the present application. As shown in FIG. 4, three nodes R1, R2, R3 constitute an IGP (for example, ISIS) domain. In order to support 5G slice, three hard-isolated FlexE channels are created between R1 and R2 and between R2 and R3, that is, FlexE-channel 1, FlexE-channel 2, and FlexE-channel 3.

Figure 5:
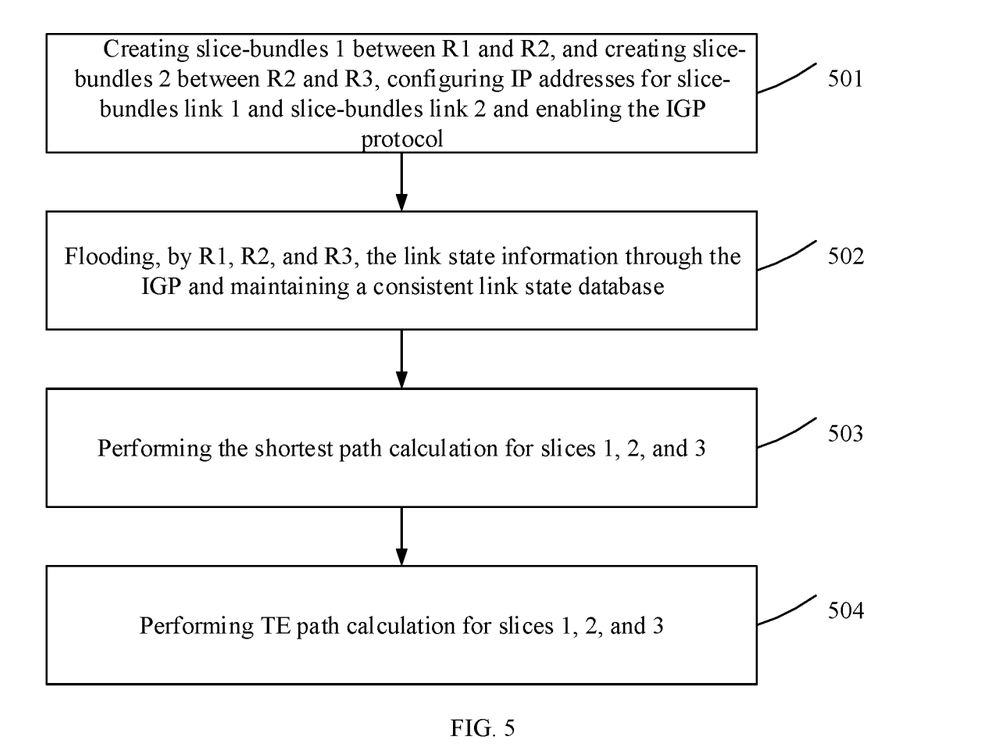
FIG. 5 is a flowchart diagram illustrating a method for creating network slices according to Example 2 of the present application.

FIG. 5 is a flowchart diagram illustrating the method for creating network slices according to Example 2 of the present application. As shown in FIG. 5, the method comprises the following steps.

Step 501: creating slice-bundles 1 (slice-bundles link 1) between R1 and R2, creating slice-bundles 2 (slice-bundles link 2) between R2 and R3, and configuring IP addresses for slice-bundles link 1 and slice-bundles link 2 and enabling the IGP protocol.

A slice-bundles interface (denoted as slice-bundles 1) is created on R1, and FlexE-channel 1, FlexE-channel 2, and FlexE-channel 3 are added to the slice-bundles 1 interface as member interfaces respectively. Similarly, a slice-bundles 1 interface connected to R1 and a slice-bundles 2 interface connected to R3 are created on R2, and a slice-bundles 2 interface connected to R2 is created on R3.

Before this, the nodes R1, R2, and R3 are configured to be added to the slices 1, 2 and 3 respectively. Further, FlexE-channel 1, FlexE-channel 2 and FlexE-channel 3 may be configured with their exclusive slice information, respectively. For example, FlexE-channel 1 belongs to slice 1 (ie., slice-id=1), FlexE-channel 2 belongs to slice 2 (ie., slice-id=2), and FlexE-channel 3 belongs to slice 3 (ie., slice-id=3).

The IP address is configured and the IGP protocol is enabled on the slice-bundles 1 interface, and there is no need to configure the IP address and enable the IGP protocol on the FlexE-channel 1, FlexE-channel 2, and FlexE-channel 3 interfaces, respectively.

Assuming that all member interfaces in each slice-bundles interface are valid and the FlexE-channel 1 member interface has the highest priority, the IGP protocol message forwarded to the slice-bundles interface will actually be forwarded along the FlexE-channel 1 member interface.

At step 502, flooding, by R1, R2, and R3, the link state information through the IGP and maintaining a consistent link state database.

In this step, the flooding process of the slice-bundles link will also contain all member link information, and a consistent link state database will be maintained on R1, R2, and R3. In the link state database, the slice-id attribute information of each node and each link is recorded. For example, in Example 2, all nodes have attribute values of slice-id=1, 2, 3, that is, each slice-bundles 3-layer link does not belong to a specific slice, but the 2-layer member link contained in each slice-bundles 3-layer link has the corresponding slice-id attribute, that is, the FlexE-channel 1 member link has the attribute value of slice-id=1, the FlexE-channel 2 member link has the attribute value of slice-id=2, and the FlexE-channel 3 member link has the attribute value of slice-id=3.

At step 503, performing the shortest path calculation for slices 1, 2, and 3.

On R1, since it is added to slice 1, the shortest path from R1 to other nodes in slice 1 is calculated by running the CSPF algorithm based on the above-mentioned link state database. The constraint conditions of the CSPF algorithm calculation are: {slice-id=1, igp-metric is the smallest}. In the calculation process using the CSPF algorithm, when the links that meet the slice-id constraint are obtained in the link state database, the slice-id attribute of the member 2-layer links contained in the slice-bundles 3-layer link will be used for matching, and the igp-metric constraint condition is used for matching the igp-metric attribute of the slice-bundles 3-layer link. In Example 2, forwarding the next hop in the shortest path from R1 to R2 and R3 in slice 1 may be expressed as:

Next-hop: the IP address of the slice-bundles 1 interface on the R2 side;

Interface: slice-bundles 1 interface of 3 layers, FlexE-channel 1 member interface of 2 layers;

Similarly, forwarding the next hop in the shortest path from R2 to R1 in slice 1 may be expressed as:

Next-hop: the IP address of the slice-bundles 1 interface on the R1 side;

Interface: slice-bundles 1 3-layer interface, FlexE-channel 1 2-layer member interface of 2 layers;

Similarly, forwarding the next hop in the shortest path from R2 to R3 in slice 1 may be expressed as:

Next-hop: the IP address of the slice-bundles 2 interface on the R3 side;

Interface: slice-bundles 2 3-layer interface, FlexE-channel 1 2-layer member interface of 2 layers;

Similarly, forwarding the next hop in the shortest path from R3 to R1 and R2 in slice 1 may be expressed as:

Next-hop: the IP address of the slice-bundles 2 interface on the R2 side;

Interface: slice-bundles 2 3-layer interface of 3 layers, FlexE-channel 1 2-layer member interface.

The slice-bundles 3-layer interface and the actual forwarded FlexE-channel 2-layer member interface may be given when forwarding the next hop information in the above-mentioned shortest path; or the slice-bundles 3-layer interface and the corresponding slice-id value may be given, and the actual forwarded FlexE-channel 2-layer member interface may be matched in the slice-bundles 3-layer interface according to the slice-id in the message forwarding process.

The shortest path calculations for other slices 2 and 3 are similar. Therefore, a routing and forwarding table in each slice may be established accordingly. In order to distinguish the shortest path forwarding traffic in different slices in the network, an appropriate method is to assign different MPLS (Multiprotocol Label Switching) labels to the same prefix FEC (Forwarding Equivalence Class) of different slices, and establish different MPLS LSP (Label Switched Path), which can be supported by extending LDP, Segment Routing and other technologies.

At step 504, performing TE path calculation for slices 1, 2, and 3.

On the node R1, a calculation of the TE path from R1 to R3 in slice 1 that meets the constraint condition A may be triggered by a service or configuration. The calculation is performed based on the above consistent link state database by using the CSPF algorithm and the constraint condition thereof is {slice-id=1, constraint condition A}, where the constraint condition A may contain at least one of bandwidth, delay, affinity, TE metric, maximum number of the hops and other factors. The calculations for TE path in other slices are similar. In Example 2, the calculated TE path is: {node R1, 3-layer link slice-bundles 1 (2-layer member link FlexE-channel 1), node R2, 3 layers link slice-bundles 2 (2-layer member link FlexE-channel 1), node R3}. The calculations of TE path in other slices are similar.

The node R1 may also send the above TE path calculation request to the controller through the PCEP protocol. The calculation operation of the controller is similar as the above, but before the controller performs the TE path calculation, the controller needs to collect (for example, through BGP-LS) the link state database on the network side (which contains the slice-id attribute).

In order to distinguish the TE path forwarding traffic in different slices in the network, different 2-layer member links in the slice-bundles 3-layer link may be assigned different adjacency segment identifiers (adjacency-sid) by using the Segment Routing technology.

Example 3

In Example 3, the slice is a Heterogeneous Network. A heterogeneous network refers to that the virtual network topology maps corresponding to different slices are not the same, which means that some network resources are divided by some slices, while some other network resources are divided by some other slices.

Figure 6:
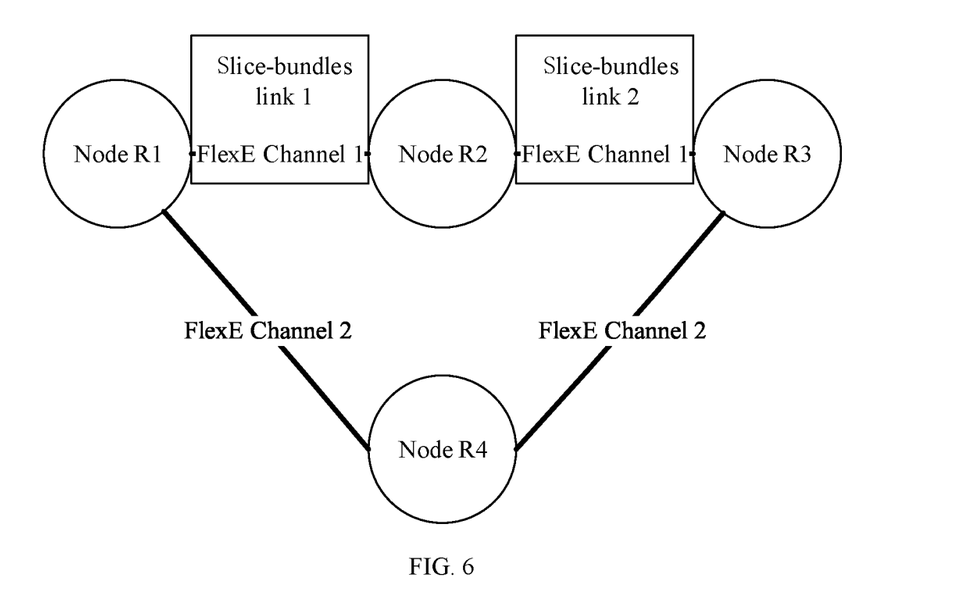
FIG. 6 is a network topology diagram of the network slice according to Example 3 of the present application.

FIG. 6 is a network topology diagram illustrating the network slice according to Example 3 of the present application. As shown in FIG. 6, four nodes R1, R2, R3, and R4 constitute an IGP (for example, ISIS) domain. In order to support 5G slice, a hard-isolated FlexE channel is created between R1 and R2, between R2 and R3, between R1 and R4, and between R4 and R3, respectively. FlexE link 1 is created between R1 and R2, FlexE channel 1 is created between R2 and R3, FlexE link 2 (FlexE channel 2) is created between R1 and R4, and FlexE link 2 (FlexE channel 2) is created between R4 and R3.

Figure 7:
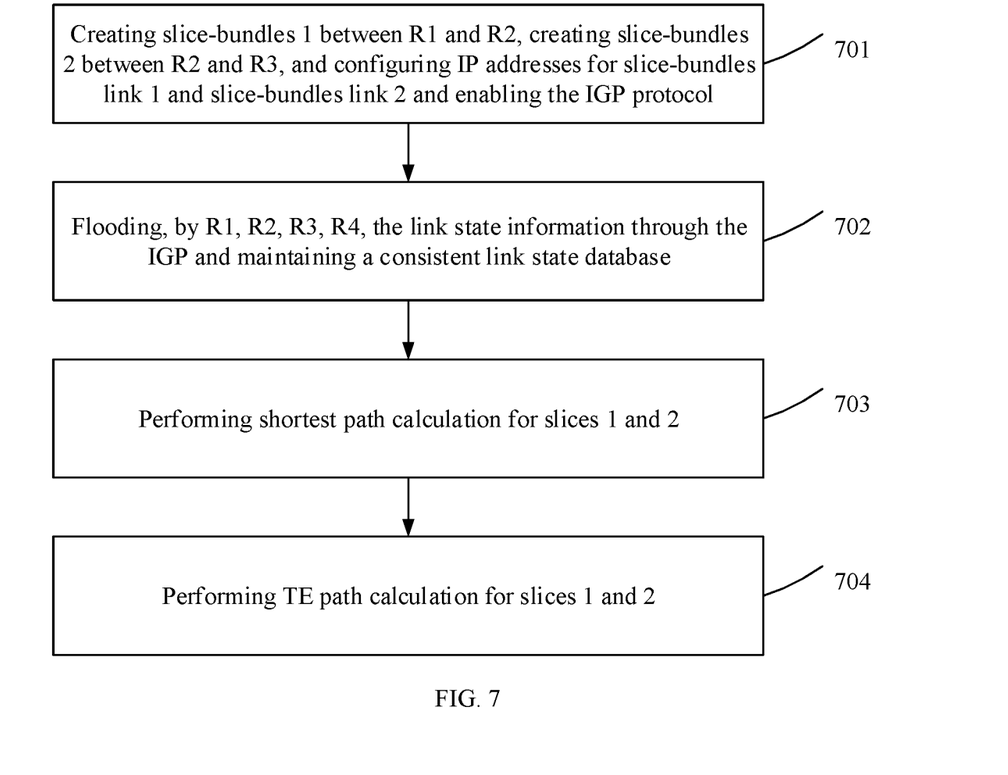
FIG. 7 is a flowchart diagram illustrating a method for creating network slices according to Example 3 of the present application.

FIG. 7 is a flowchart diagram illustrating the method for creating network slices according to Example 3 of the present application. As shown in FIG. 7, the method comprises the following steps.

At step 701, creating slice-bundles 1 between R1 and R2, creating slice-bundles 2 between R2 and R3, and configuring IP addresses for slice-bundles link 1 and slice-bundles link 2 and enabling the IGP protocol.

In order to add a new FlexE channel between R1 and R2 and between R2 and R3, a corresponding slice-bundles interface is created. As the link bandwidth resources are limited, no new FlexE channel will be created between R1 and R4 and between R4 and R3, and no slice-bundles interface will be created, but the packet service will be directly configured on the traditional FlexE channel 2. A slice-bundles interface (denoted as slice-bundles 1) is created on R1, and FlexE channel 1 is added as a member interface to the slice-bundles 1 interface. Similarly, a slice-bundles 1 interface connected to R1 and a slice-bundles 2 interface connected to R3 are also created on R2. A slice-bundles 2 interface connected to R2 is created on R3.

Before this, the nodes R1, R2, and R3 are configured to be added to slice 1, and the nodes R1, R4, and R3 are configured to be added to slice 2, respectively. Each member interface in the slice-bundles 1 interface and the slice-bundles 2 interface is configured with exclusive slice information. For example, FlexE channel 1 belongs to slice 1.

An IP address is configured on the slice-bundles 1 interface and slice-bundles 2 interface and the IGP protocol is enabled. There is no need to configure an IP address and enable the IGP protocol on the FlexE channel 1 interface.

Assuming that all member interfaces in each slice-bundles interface are valid and the FlexE channel 1 member interface has the highest priority, the IGP protocol message forwarded to the slice-bundles interface will actually be forwarded along the FlexE channel 1 member interface.

At step 702, flooding, by R1, R2, R3, R4, the link state information through the IGP and maintaining a consistent link state database.

In the flooding process of the slice-bundles link, all member link information will be included, and a consistent link state database will be maintained on R1, R2, R3 and R4. In the link state database, the slice-id attribute information of each node and each link is recorded. For example, in Example 3, through IGP flooding, a consistent link state database will be obtained on each node, that is, nodes R1 and R3 have attribute values of slice-id=1 and slice-id=2, node R2 has an attribute value of slice-id=1, and node R4 has an attribute value of slice-id=2. The 2-layer member link FlexE channel 1 of the 3-layer link slice-bundles 1 and slice-bundles 2 have an attribute value of slice-id=1, respectively, while the 3-layer FlexE channel 2 link has an attribute value of slice-id=2.

At step 703, performing shortest path calculation for slices 1 and 2.

Each node knows the slices to which it is added, and the node will calculate, based on the above-mentioned link state database, the shortest path forwarding information from the node to other nodes in the corresponding slice thereof, by using the CSPF algorithm and according to the constraint conditions {slice-id, igp-metric minimum}. For example, in Example 3, the shortest path forwarding next hop from R1 to R2 and R3 in slice 1 may be expressed as:

Next-hop: the IP address of the slice-bundles 1 interface on the R2 side;

Interface: slice-bundles 1 3-layer interface, FlexE channel 1 2-layer member interface;

For example, the shortest path forwarding next hop from R1 to R4 and R3 in slice 2 may be expressed as:

Next-hop: the IP address of the FlexE channel 2 interface on the R4 side;

Interface: FlexE channel 2 3-layer interface;

Other nodes similarly generate shortest path forwarding information in each slice.

At step 704, performing TE path calculation for slices 1 and 2.

On the node R1, a calculation of the TE path from R1 to R3 in slice 1 that meets the constraint condition A may be triggered by a service or configuration The calculation is performed based on the above consistent link state database by using the CSPF algorithm and the constraint condition thereof is {slice-id=1, constraint condition A}. The calculation may be performed based on the above consistent link state database, by the source node R1 itself through the CSPF algorithm, or may be calculated by PCE, requested by R1, through the PCEP protocol.

The constraint conditions A may contain at least one of bandwidth, delay, affinity, TE metric, maximum number of the hops, etc. The calculations of TE path in other slices are similar.

The node R1 may also send the above TE path calculation request to the controller through the PCEP protocol. The calculation operation of the controller is similar to the above, but before the calculation, the controller needs to collect (for example, through BGP-LS) the link state database on the network side (which contains the slice-id attribute).

In order to distinguish the TE path forwarding traffic in different slices in the network, different 2-layer member links in the slice-bundles 3-layer link may be assigned different adjacency-sid when using the Segment Routing technology.

The FlexE channel in Example 3 may be replaced with links of other link types, such as traditional ethernet link, VLAN sub-interface, P2P link, and aggregate link, and the processing flows are similar.

Example 4

Example 4 may be applied to a slice network across AS domains.

Figure 8:
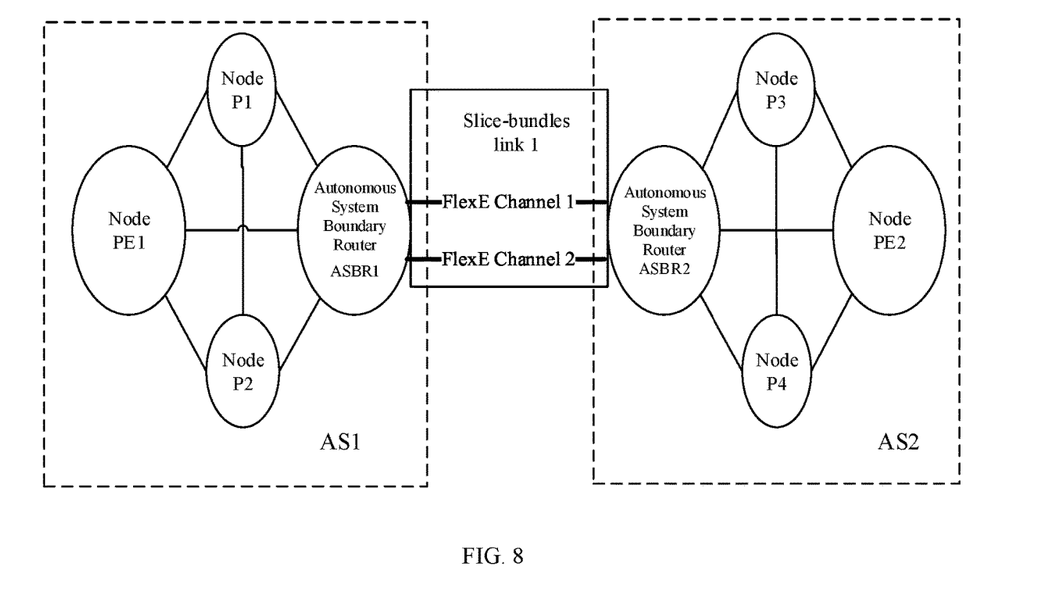
FIG. 8 is a network topology diagram of the network slice according to Example 4 of the present application.

FIG. 8 is a network topology diagram illustrating the network slice according to Example 4 of the present application. As shown in FIG. 8, the network contains two autonomous systems, AS1 and AS2, which are directly connected through ASBR2 and ASBR1. In order to support 5G slice, two hard-isolated FlexE link 1 (FlexE channel 1) and FlexE link 2 (FlexE channel 2) are created between ASBR1 and ASBR2, and the FlexE channel 1 belongs to slice 1, and the FlexE channel 2 belongs to slice 2.

Figure 9:
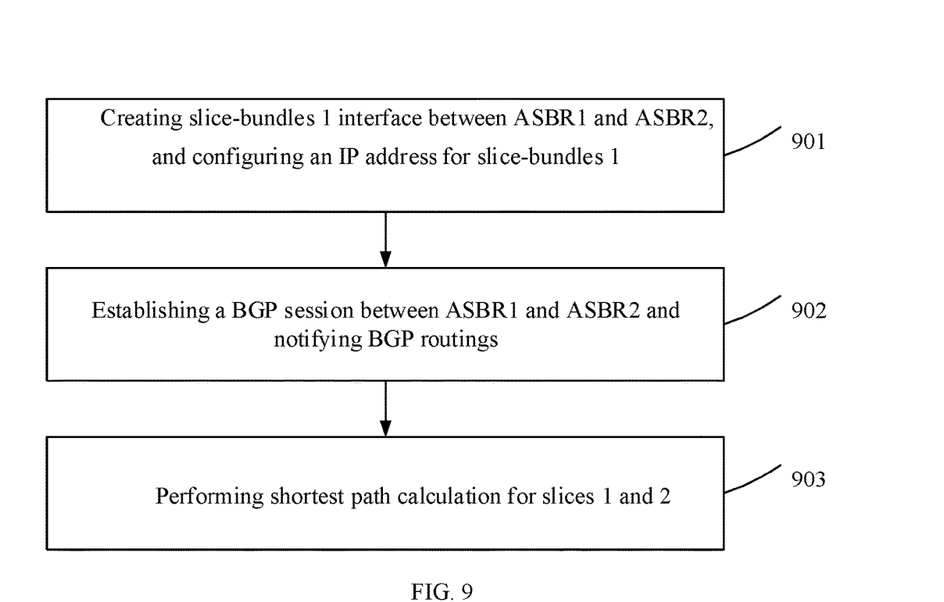
FIG. 9 is a flowchart diagram illustrating a method for creating network slices according to Example 4 of the present application.

FIG. 9 is a flowchart diagram illustrating the method for creating network slices according to Example 4 of the present application. As shown in FIG. 9, the method comprises the following steps.

At step 901, creating slice-bundles link 1 (slice-bundles 1) between ASBR1 and ASBR2, and configuring an IP address for slice-bundles 1;

In order to facilitate extending, slice-bundles 1 interfaces are created on ASBR1 and ASBR2, respectively, and all FlexE channels between the two nodes are added to the slice-bundles 1 interfaces of the corresponding nodes as 2-layer member interfaces. In this example, the service is configured on the slice-bundles 1 interface, that is, an IP address is configured on the slice-bundles 1 interface. The IP address is used as a TCP (Transmission Control Protocol) link establishment address of a BGP session between ASBR1 and ASBR2.

At step 902, establishing a BGP session between ASBR1 and ASBR2 and notifying BGP routings.

Only one BGP session needs to be established between ASBR1 and ASBR2, regardless of the number of slices. Assuming that all the member interfaces in each slice-bundles interface are valid, and the FlexE channel 1 member interface has the highest priority, the BGP protocol message forwarded to the corresponding slice-bundles interface will actually be forwarded along the FlexE channel 1 member interface.

The BGP session between ASBR1 and ASBR2 may be used to notify a plurality of types of BGP routings. For example, ASBR2 may notify ASBR1 of BGP-LU (BGP Labeled unicast) routings (see RFC8277), BGP/MPLS IP VPN routings (see RFC4364), etc., through BGP.

Step 903: performing the shortest path calculation for slices 1 and 2.

In order to distinguish the shortest path forwarding traffic in different slices between ASBR1 and ASBR2, an appropriate method is to allocate and notify different BGP labels for the same BGP routings of different slices, and establish different BGP LSPs, that is, the next hop information contained in the forwarding table entry corresponding to the BGP LSP will be supplemented with slice-id information or 2-layer member interface information corresponding to the slice-id. This can be supported by extending BGP.

For example, ASBR2 can notify ASBR1 of BGP-LU (BGP Labeled unicast) routings belonging to slice 1 (see RFC8277), BGP/MPLS IP VPN routings (see RFC4364), etc., to through BGP. In the process of ASBR2 notifying the BGP routing message to ASBR1, if the BGP next hop attribute in the message may be modified to this ASBR2, then the next hop information contained in the shortest path forwarding table entry formed after receiving the routing notification on ASBR1 may be expressed as:

Next-hop: the IP address of the slice-bundles 1 interface on the ASBR2 side;

Interface: slice-bundles 1 3-layer interface, FlexE channel 1 2-layer member interface.

In an example, the slice-bundles 3-layer interface and the actual forwarded FlexE channel 2-layer member interface may be given in the above shortest path forwarding next hop information; or the slice-bundles 3-layer interface and corresponding slice-id value may be given and in the message forwarding process, the actual forwarded FlexE channel 2-layer member interface is matched in the slice-bundles 3-layer interface according to the slice-id.

In addition, ASBR1 and ASBR2 may report to the controller the slice-bundles link therebetween as link state data. In the reporting process, all member link information and the slice-id attributes need to be contained, such that the controller has a link connection relationship cross-AS domains, which is convenient for the controller to calculate a TE path cross-AS domains for a specific slice. This can be supported by extending BGP-LS.

The FlexE channel in Example 4 may be replaced with links of other link types, such as traditional ethernet link, VLAN sub-interface, P2P link, and aggregate link, and the processing flows are similar.

Example 5

On the basis of Examples 1 to 4, the method for creating network slices further includes: if there is a new slice to be created, only a new FlexE channel needs to be created and the new FlexE channel is added to the slice-bundles interface as a member interface. Except that the slice-id attribute needs to be configured for the new FlexE channel member interface, other configurations do not need to be modified, so the expansibility is very good.

The embodiments of the present application also provide an apparatus for creating network slices, comprising a memory, a processor, and a computer program stored on the memory and run on the processor, when executed by the processor, the computer program implements any of the foregoing methods for creating network slices.

The embodiments of the present application also provide a computer-readable storage medium storing an information processing program that, when executed by a processor, implements any of the foregoing methods for creating network slices.

It will be appreciated by those skilled in the art that all or some of the steps in the methods, functional modules/units in the system and apparatus disclosed above may be implemented as software, firmware, hardware, and appropriate combinations thereof. In hardware implementations, the division between functional modules/units mentioned in the above description does not necessarily correspond to the division of physical components; for example, one physical component may have multiple functions, or one function or step may be cooperatively executed by several physical components. Some or all components may be implemented as software executed by a processor, such as a digital signal processor or a microprocessor, or as hardware, or as an integrated circuit, such as an application specific integrated circuit. Such software may be distributed on a computer-readable medium, and the computer-readable medium may comprise a computer storage medium (or non-transitory medium) and a communication medium (or transitory medium). As is well known to those skilled in the art, the term computer storage medium comprises volatile and non-volatile, removable and non-removable media implemented in any method or technology for storing information (such as computer-readable instruction, data structure, program module, or other data). Computer storage media comprise, but are not limited to, Random Access Memory (RAM), Read-Only Memory (ROM), Electrically Erasable Programmable Read-Only Memory (EEPROM), Flash memory or other storage technologies, Compact Disc Read-Only Memory (CD-ROM), Digital Video Disc (DVD) or other optical storage, magnetic cassette, magnetic tape, disk storage or other magnetic storage or any other medium that can be used to store desired information and be accessed by a computer. In addition, as is well known to those skilled in the art, communication media usually contain computer-readable instruction, data structure, program module, or other data in a modulated data signal such as carrier waves or other transmission mechanism, and may comprise any information delivery media.

What is claimed is:

1. A method for creating network slices, comprising:
creating a slice-bundles link between a first node and a second node, wherein, the slice-bundles link comprises at least one member link between the first node and the second node; and
configuring a packet service for the slice-bundles link;
wherein before creating the slice-bundles link between the first node and the second node, the method further comprises:
creating the at least one member link between the first node and the second node; and
configuring, for each member link of the at least one member link, a slice to which the member link belongs, and configuring, for each node of the first node and the second node, a slice to which the node belongs;
wherein, the creating the slice-bundles link between the first node and the second node comprises creating interconnected slice-bundles interfaces on the first node and the second node, respectively, and adding the at least one member link to the slice-bundles interfaces as a member interface, and wherein, an IP address is configured and an interior gateway protocol (IGP) is enabled on the slice-bundles interfaces;
the method further comprising:
flooding link state information and maintaining a consistent link state database on each node;
wherein, the link state database records the flooded link state information, and the link state information carries a slice attribute of each node and carries state information and a slice attribute of each member link; and
performing slice path calculation based on the link state database;
wherein the performing slice path calculation comprises:
performing a constrained shortest path first (CSPF) calculation to calculate a shortest path from the first node to all other destination nodes in the first slice to which the first node belongs, wherein, constraint conditions for performing the CSPF calculation are {slice-id of the first slice, igp-metric is the smallest}; and the calculation comprises: matching a slice attribute of each member link contained in the slice-bundles link and a slice attribute of each node according to the constraint conditions to obtain an optimal next hop forwarded by the shortest path of the first slice.

2. The method of claim 1, wherein the configuring, for each member link of the at least one member link, the slice to which the member link belongs, and configuring, for each node of the first node and the second node, the slice to which the node belongs comprises:
configuring, for the each member link, at least one slice attribute of the member link; and configuring, for the each node, at least one slice attribute of the node.

3. The method of claim 1, wherein the configuring the packet service for the slice-bundles link comprises configuring the packet service on the slice-bundles interfaces.

4. The method of claim 1, further comprising:
forwarding messages along the slice-bundles link.

5. The method of claim 4, further comprising:
setting a priority for each member link in the slice-bundles link according to a local policy.

6. The method of claim 5, wherein the forwarding the messages along the slice-bundles link comprises:

in a process of forwarding a protocol message in a control plane along the slice-bundles link, selecting an effective member link with the highest priority from the slice-bundles link for forwarding.

7. The method of claim 4, wherein forwarding the messages along the slice-bundles link comprises:
in a process of forwarding a data message in a data plane along the slice-bundles link, selecting a dedicated member link of the slice to which the data message belongs from the slice-bundles link for forwarding; and
if the dedicated member link of the slice to which the data message belongs is invalid, discarding the data message.

8. The method of claim 1, further comprising:
creating a new member link when creating a new slice;
configuring the new member link as belonging to the new slice; and
adding the new member link to the slice-bundles link.

9. The method of claim 1, wherein the configuring the packet service comprises configuring at least one of IP address, enabling intermediate system to intermediate system (ISIS), resource reservation protocol traffic engineering (RSVP-TE), open shortest path first (OSPF) and label distribution protocol (LDP).

10. The method of claim 1, wherein the member link comprises one of the following:
flexible Ethernet channel (FlexE channel), aggregated link, Ethernet link, Ethernet VLAN sub-interface and P2P link.

11. The method of claim 1, wherein all slices are homogeneous networks or heterogeneous networks.

12. The method of claim 1, wherein the first node and the second node belong to a same autonomous system AS domain; or the first node and the second node belong to different AS domains, respectively.

13. An apparatus for creating network slices, comprising a memory, a processor, and a computer program stored on the memory and run on the processor, when executed by the processor, the computer program implements a method for creating network slices, wherein, the method comprises:
creating a slice-bundles link between a first node and a second node, wherein, the slice-bundles link comprises at least one member link between the first node and the second node; and
configuring a packet service for the slice-bundles link,
wherein before creating the slice-bundles link between the first node and the second node, the method further comprises:
creating the at least one member link between the first node and the second node; and
configuring, for each member link of the at least one member link, a slice to which the member link belongs, and configuring, for each node of the first node and the second node, a slice to which the node belongs,
wherein, the creating the slice-bundles link between the first node and the second node comprises creating interconnected slice-bundles interfaces on the first node and the second node, respectively, and adding the at least one member link to the slice-bundles interfaces as a member interface, and wherein, an IP address is configured and an interior gateway protocol (IGP) is enabled on the slice-bundles interfaces;
the method further comprising:
flooding link state information and maintaining a consistent link state database on each node;
wherein, the link state database records the flooded link state information, and the link state information carries a slice attribute of each node and carries state information and a slice attribute of each member link; and
performing slice path calculation based on the link state database;
wherein the performing slice path calculation comprises:
performing a constrained shortest path first (CSPF) calculation to calculate a shortest path from the first node to all other destination nodes in the first slice to which the first node belongs, wherein, constraint conditions for performing the CSPF calculation are {slice-id of the first slice, igp-metric is the smallest}; and the calculation comprises: matching a slice attribute of each member link contained in the slice-bundles link and a slice attribute of each node according to the constraint conditions to obtain an optimal next hop forwarded by the shortest path of the first slice.

14. A non-transitory computer-readable storage medium stored with an information processing program, wherein, when executed by a processor, the information processing program implements a method for creating network slices, wherein, the method comprises:
creating a slice-bundles link between a first node and a second node, wherein, the slice-bundles link comprises at least one member link between the first node and the second node; and
configuring a packet service for the slice-bundles link,
wherein before creating the slice-bundles link between the first node and the second node, the method further comprises:
creating the at least one member link between the first node and the second node; and
configuring, for each member link of the at least one member link, a slice to which the member link belongs, and configuring, for each node of the first node and the second node, a slice to which the node belongs,
wherein, the creating the slice-bundles link between the first node and the second node comprises creating interconnected slice-bundles interfaces on the first node and the second node, respectively, and adding the at least one member link to the slice-bundles interfaces as a member interface, and wherein, an IP address is configured and an interior gateway protocol (IGP) is enabled on the slice-bundles interfaces;
the method further comprising:
flooding link state information and maintaining a consistent link state database on each node;
wherein, the link state database records the flooded link state information, and the link state information carries a slice attribute of each node and carries state information and a slice attribute of each member link; and
performing slice path calculation based on the link state database;
wherein the performing slice path calculation comprises:
performing a constrained shortest path first (CSPF) calculation to calculate a shortest path from the first node to all other destination nodes in the first slice to which the first node belongs, wherein, constraint conditions for performing the CSPF calculation are {slice-id of the first slice, igp-metric is the smallest}; and the calculation comprises: matching a slice attribute of each member link contained in the slice-bundles link and a slice attribute of each node according to the constraint conditions to obtain an optimal next hop forwarded by the shortest path of the first slice.

* * * * *